(12) United States Patent
Bulut et al.

(10) Patent No.: US 10,649,758 B2
(45) Date of Patent: May 12, 2020

(54) GROUP PATCHING RECOMMENDATION AND/OR REMEDIATION WITH RISK ASSESSMENT

(71) Applicant: International Business Machines Corporation, Armonk, NY (US)

(72) Inventors: Muhammed Fatih Bulut, New York, NY (US); Lisa M. Chavez, Placitas, NM (US); Jinho Hwang, Ossining, NY (US); Virginia Mayo, Jersey City, NJ (US); Vugranam C. Sreedhar, Yorktown Heights, NY (US); Sai Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/800,612

(22) Filed: Nov. 1, 2017

(65) Prior Publication Data

US 2019/0129705 A1 May 2, 2019

(51) Int. Cl.
*G06F 8/65* (2018.01)
*G06F 21/57* (2013.01)
(Continued)

(52) U.S. Cl.
CPC ............ *G06F 8/65* (2013.01); *G06F 11/3604* (2013.01); *G06F 11/3612* (2013.01);
(Continued)

(58) Field of Classification Search
None
See application file for complete search history.

(56) References Cited

U.S. PATENT DOCUMENTS 7,647,637 B2 1/2010 Schuba et al.
8,793,681 B2 7/2014 Ayachitula et al.
(Continued)

FOREIGN PATENT DOCUMENTS

EP 3188436 A1 7/2017
WO 2015105486 A1 7/2015

OTHER PUBLICATIONS

GRDA, "SPP CIP Workshop," Last Accessed: Aug. 28, 2017, Dallas, 332 pages.
(Continued)

*Primary Examiner* — Duy Khuong T Nguyen
*Assistant Examiner* — Mark A Gooray
(74) *Attorney, Agent, or Firm* — Amin, Turocy & Watson, LLP

(57) ABSTRACT

Techniques that facilitate group patching recommendation and/or remediation with risk assessment are provided. In one example, a system includes a vertical stack component, a horizontal stack component and a risk classification component. The vertical stack component identifies a first patch profile from a software system associated with a computer system environment. The horizontal stack component identifies a second patch profile from a hardware system associated with network nodes of the computer system environment. The system learns over time to identify repetitive patterns using machine learning techniques. Then, the risk classification component performs a machine learning process to determine a risk classification for the computer system environment based on the first patch profile and the second patch profile.

20 Claims, 10 Drawing Sheets

(51) Int. Cl.
*G06F 11/36* (2006.01)
*G06F 21/50* (2013.01)
*G06N 20/00* (2019.01)

(52) U.S. Cl.
CPC .......... *G06F 11/3616* (2013.01); *G06F 21/50* (2013.01); *G06F 21/57* (2013.01); *G06F 21/577* (2013.01); *G06N 20/00* (2019.01)

(56) References Cited

U.S. PATENT DOCUMENTS

| | | |
|---|---|---|
| 9,436,457 B2 | 9/2016 | Mencias et al. |
| 9,930,060 B2 * | 3/2018 | Oberheide ............ G06F 21/577 |
| 2015/0081910 A1 * | 3/2015 | Assuncao ........... G06F 9/45558 709/226 |
| 2017/0091078 A1 | 3/2017 | Atyam et al. |
| 2017/0171236 A1 | 6/2017 | Ouchn |
| 2017/0178038 A1 | 6/2017 | Guven et al. |
| 2017/0201545 A1 | 7/2017 | Nicodemus et al. |

OTHER PUBLICATIONS

NERC, "CIP-002-4—Cyber Security—Critical Cyber Asset Identification," Dec. 2010, 18 pages.
Fireye.com, "Threat Intelligence Reports," retrieved Jul. 28, 2017, 6 pages.
Eisac.com, "The Electricity Information Sharing and Analysis Center offers security services to owner and operator organizations of the Bulk Power System across North America," retrieved Jul. 28, 2017, 6 pages.
FERC, "FERC Proposes to Adopt New Cyber Security Standards," News Release: Apr. 18, 2013, 1 page.
Halscott, "Desktop Virtualization and Evolving Strategies for IT Service Delivery," Last Accessed: Aug. 28, 2017, 48 pages.
Spp.org, "Forward: 2016 Annual Report," retrieved Jul. 28, 2017, 4 pages.
McDowall, "Chromatography Data Systems, Part IV: Managing Change in a Changing World, " LCGC vol. 19 No. 2 Feb. 2001, 10 pages.
Nvd.Nist.Gov, "National Vulnerability Database," retrieved Jul. 28, 2017, 2 pages.
Tom, et al., "Recommended Practice for Patch Management of Control Systems," DHS National Cyber Security Division Control Systems Security Program, Dec. 2008, 29 pages.
IBM, "A Strategic Approach to Protecting SCADA and Process Control Systems," Jul. 2007, 13 pages.
Nerc.com, "Security Reliability Program," retrieved Jul. 28, 2017, 2 pages.
Nerc.com, "Standards Subject to Future Enforcement," retrieved Jul. 28, 2017, 1 page.
Carnegie Mellon University, "Vulnerability Notes," Copyright © 1999-2017, 1 pages.

* cited by examiner

GROUP PATCHING RECOMMENDATION AND/OR REMEDIATION WITH RISK ASSESSMENT

BACKGROUND

The subject disclosure relates to computer systems, and more specifically, to identifying and/or repairing computer system vulnerabilities with groups that share the risks.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate group patching recommendation and/or remediation with risk assessment are described.

According to an embodiment, a system can comprise a vertical stack component, a horizontal stack component and a risk classification component. The vertical stack component can identify a first patch profile from a software system associated with a computer system environment. The horizontal stack component can identify a second patch profile from a hardware system associated with network nodes of the computer system environment. The risk classification component can perform a machine learning process to determine a risk classification for the computer system environment based on the first patch profile and the second patch profile.

According to another embodiment, a computer-implemented method is provided. The computer-implemented method can comprise identifying, by a system operatively coupled to a processor, a first patch profile from a software system associated with a computer system environment. The computer-implemented method can also comprise identifying, by the system, a second patch profile from a hardware system associated with network nodes of the computer system environment. Furthermore, the computer-implemented method can comprise determining, by the system, a risk classification for the computer system environment based on a machine learning process associated with the first patch profile and the second patch profile.

According to yet another embodiment, a computer program product for facilitating patching recommendation and remediation with risk assessment can comprise a computer readable storage medium having program instructions embodied therewith. The program instructions can be executable by a processor and cause the processor to identify, by the processor, a first patch profile from a software system associated with a computer system environment. The program instructions can also cause the processor to identify, by the processor, a second patch profile from a hardware system associated with network nodes of the computer system environment. Furthermore, the program instructions can cause the processor to determine, by the processor, a risk classification for the computer system environment based on a machine learning process associated with the first patch profile and the second patch profile. The program instructions can also cause the processor to determine, by the processor, an execution plan to alter one or more portions of the computer system environment based on the risk classification.

DETAILED DESCRIPTION

Figure 1:
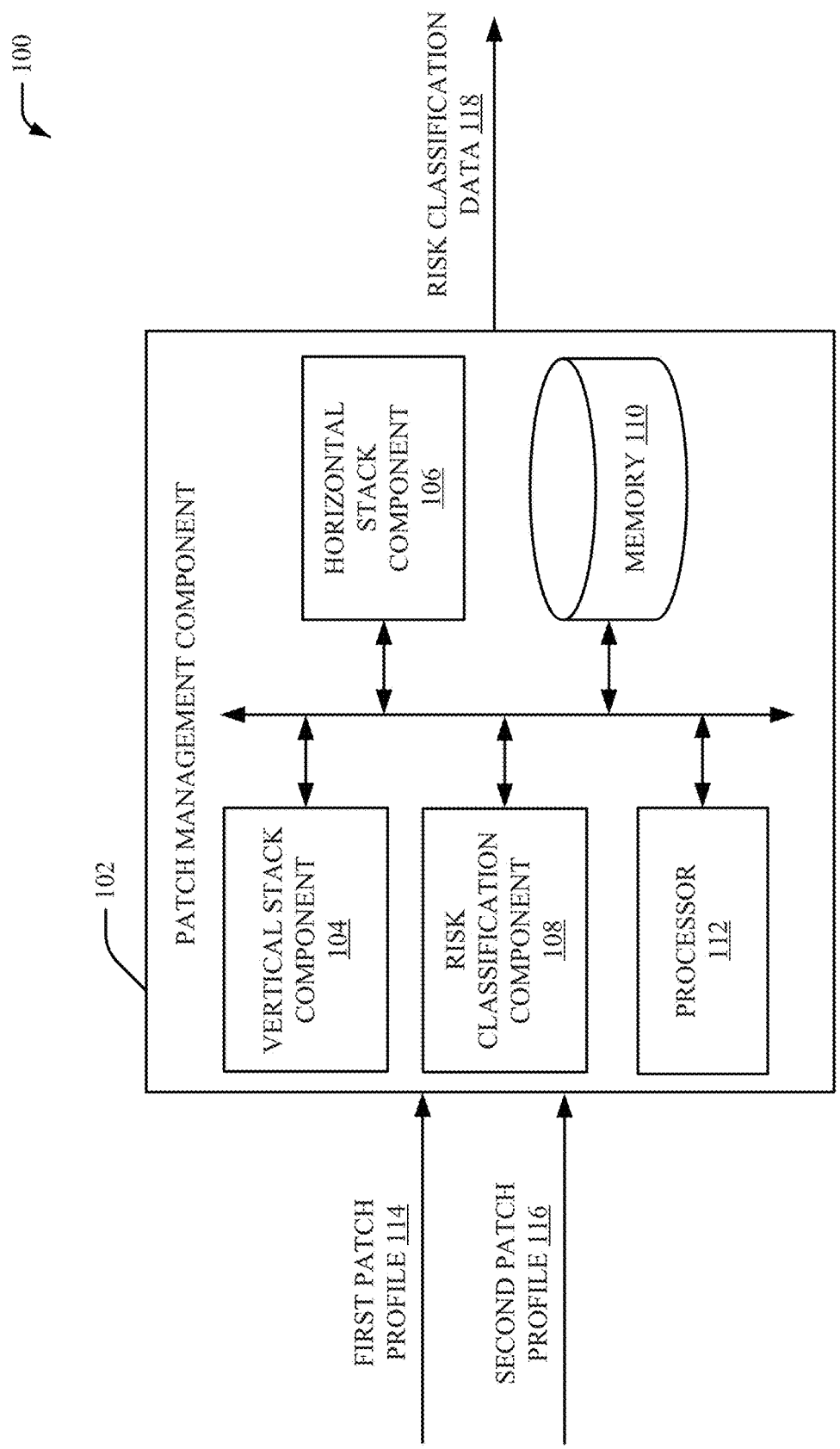
FIG. 1 illustrates a block diagram of an example, non-limiting system that includes a patch management component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Patching is a computer system process for identifying and/or repairing computer system vulnerabilities. A patch is software that includes a set of processing threads to identify and/or repair computer system vulnerabilities. A patch can be applied to various parts of a computer system such as, for example, an operating system, a server, a router, a computing device, a desktop computer, a mobile device, a firewall, an email client, a computing office suite, an infrastructure component (e.g., a component within a network infrastructure), another component of a computer system, etc. Often times, a group of components in a computer system (e.g., a group of servers with same network, software, or virtualization layer) share risk impact of a computer system vulnerability. However, risk impact between multiple components in a computer system is generally difficult to identify due to communication complexity and dynamicity. Furthermore, a number of patches necessitated by a computer system during an interval of time can be greater than an ability of a patching process of the computer system. Therefore, a patch management process to provide proper preventive measures against computer system vulnerabilities is needed.

Embodiments described herein include systems, computer-implemented methods, and computer program products that facilitate group patching recommendation and/or remediation with risk assessment. In an aspect, a patch management engine and/or a patch management process can assess risk level for a computer system environment. Additionally, the patch management engine and/or the patch management process can recommend one or more risk remediation execution plans to modify a current risk level for the computer system environment to a target risk level for the computer system environment. The target risk level can provide preventive measures against computer system vulnerabilities associated with the computer system environment. As such, a vulnerability risk remediation plan can be determined based on a vulnerability risk assessment for the computer system environment. In an embodiment, one or more first missing patch profiles can be identified from a vertical stack perspective associated with the computer system environment. The vertical stack perspective can include, for example, an operating system associated with the computer system environment, one or more memory resources (e.g., one or more library resources) associated with the computer system environment, one or more applications associated with the computer system environment, etc. Furthermore, one or more second missing patch profiles can be determined from a horizontal stack perspective associated with the computer system environment. The horizontal stack perspective can be across different nodes of the computer system environment. The horizontal stack perspective can also be associated with one or more servers, one or more server groups, one or more server types, etc. Risk measures and/or risk categories (e.g., risk profiles) can also be determined based on the one or more first patch profiles and the one or more second missing patch profiles identified from the computer system environment. Additionally, a group risk classification can be determined based on the risk measures and/or the risk categories. In certain embodiments, a risk remediation execution plan can also be applied to the computer system environment based on the group risk classification. As such, identification of dependencies among software of a computer system environment and/or hardware of a computer system environment can be improved to reduce impact of executing one or more patches on the computer system environment. Accordingly, identification and/or repair of computer system vulnerabilities for a computer system environment (e.g., a hardware system of a computer system environment and/or a software system of the computer system environment) can be improved. Furthermore, performance of computer system environment (e.g., a hardware system of a computer system environment and/or a software system of the computer system environment) can be improved. Efficiency and/or performance of one or more processors of a computer system environment also be improved.

FIG. 1 illustrates a block diagram of an example, non-limiting system 100 that facilitates group patching recommendation and/or remediation with risk assessment in accordance with one or more embodiments described herein. In various embodiments, the system 100 can be a patch management system associated with technologies such as, but not limited to, patching technologies, computer technologies, server technologies, information technologies, machine learning technologies, artificial intelligence technologies, digital technologies, data analysis technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a patch management component, etc.) for carrying out defined tasks related to machine learning. The system 100 and/or components of the system can be employed to solve new problems that arise through advancements in technologies mentioned above, employment of patches, and/or computer architecture, and the like. One or more embodiments of the system 100 can provide technical improvements to patching systems, computer systems, server systems, information technology systems, machine learning systems, artificial intelligence systems, digital systems, data analysis systems, and/or other systems. One or more embodiments of the system 100 can also provide technical improvements to a processing unit (e.g., a processor) associated with a patch management process by improving processing performance of the processing unit, improving processing efficiency of the processing unit, and/or reducing an amount of time for the processing unit to perform a patch management process. One or more embodiments of the system 100 can also provide technical improvements to a processing unit (e.g., a processor) associated with a computer system environment by improving processing performance of the processing unit, improving processing efficiency of the processing unit, and/or reducing an amount of time for the processing unit to perform a patch management process.

In the embodiment shown in FIG. 1, the system 100 can include a patch management component 102. As shown in FIG. 1, the patch management component 102 can include a vertical stack component 104, a horizontal stack component 106, and a risk classification component 108. Aspects of the patch management component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the patch management component 102 can also include memory 110 that stores computer executable components and instructions. Furthermore, the patch management component 102 can include a processor 112 to facilitate execution of the instructions (e.g., computer executable components and corresponding instructions) by the patch management component 102. As shown, the vertical stack component 104, the horizontal stack component 106, the risk classification component 108, the memory 110 and/or the processor 112 can be electrically and/or communicatively coupled to one another in one or more embodiments.

The patch management component 102 can receive a first patch profile 114 and a second patch profile 116. The patch management component 102 can employ the first patch profile 114 and the second patch profile 116 to generate risk classification data 118. In an aspect, the vertical stack component 104 can receive the first patch profile 114. Furthermore, the horizontal stack component 106 can receive the second patch profile 116. The first patch profile 114 can be received from, for example, a software system associated with a computer system environment. The second patch profile 116 can be received from, for example, a hardware system associated with network nodes of the computer system environment. In certain embodiments, the first patch profile 114 associated with the software system and/or the second patch profile 116 associated with the hardware system can be stored in a database. Therefore, in certain embodiments, the first patch profile 114 associated with the software system and/or the second patch profile 116 associated with the hardware system can be received from a database. In a non-limiting example, the first patch profile 114 can be a patch profile for an operating system for the computer system environment, one or more non-volatile memory resources (e.g., one or more libraries) for the computer system environment, one or more applications for the computer system that performs one or more tasks, one or more platforms for the computer system environment that hosts one or more applications, etc. The second patch profile 116 can be, for example, a patch profile for a server, a processor (e.g., a computing workload device), a group of servers, a type of server, etc.

In an embodiment, the vertical stack component 104 can identify the first patch profile 114 from the software system associated with the computer system environment. Furthermore, the horizontal stack component 106 can identify the second patch profile from the hardware system associated with the network nodes of the computer system environment. The risk classification component 108 can determine a risk classification for the computer system environment based on the first patch profile and the second patch profile. The risk classification data 118 can include the risk classification for the computer system environment. In an aspect, the risk classification component 108 can perform a machine learning process to determine the risk classification for the computer system environment based on the first patch profile and the second patch profile.

In certain embodiments, the vertical stack component 104 can compute a first risk value for the software system based on the first patch profile 114. Furthermore, the horizontal stack component 106 can compute a second risk value for the hardware system based on the second patch profile 116. Therefore, the risk classification component 108 can determine the risk classification for the computer system environment based on the first risk value for the software system and the second risk value for the hardware system. For example, the risk classification component 108 can perform the machine learning process to determine the risk classification for the computer system environment based on the first risk value for the software system and the second risk value for the hardware system. In another embodiment, the vertical stack component 104 can compute a first classification profile for the software system based on the first patch profile 114. Furthermore, the horizontal stack component 106 can compute a second classification profile for the hardware system based on the second patch profile 116. Therefore, the risk classification component 108 can determine the risk classification for the computer system environment based on the first classification profile for the software system and the second classification profile for the hardware system. For example, the risk classification component 108 can perform the machine learning process to determine the risk classification for the computer system environment based on the first classification profile for the software system and the second classification profile for the hardware system.

In yet another embodiment, the risk classification component 108 can learn one or more patterns associated with the computer system environment to determine the risk classification for the computer system environment. In certain embodiments, the risk classification component 108 can generate a user interface to display at least a portion of the risk classification data 118 in a human interpretable format. For example, risk classification component 108 can generate a user interface to display, in a human interpretable format, output data associated with the risk classification included in the risk classification data 118. As such, the risk classification component 108 can provide improved risk protection and/or reduced vulnerabilities for the computer system environment by generating the risk classification data 118. For example, identification and/or remediation of a risk vulnerability for the computer system environment be improved by generating the risk classification data 118. In certain embodiments, the risk classification component 108 can employ learning to capture repeatable patterns associated with the first patch profile 114 and/or the second patch profile 116. For example, the risk classification component 108 can employ learning to capture repeatable patterns associated with computers, patches, and/or patch execution features of a computer system environment associated with the first patch profile 114 and/or the second patch profile 116.

In another embodiment, the risk classification component 108 can define a risk score for a computer system environment associated with the first patch profile 114 and the second patch profile 116. The risk score generated by the risk classification component 108 can be a vulnerability measurement for a computer system environment associated with the first patch profile 114 and the second patch profile 116. The risk score generated by the risk classification component 108 can be generated based on impact and/or exploitability of information provided by the first patch profile 114 and the second patch profile 116. In an aspect, the risk value can be calculated based on a criticality level and a patch risk. A patch risk can be determined based on multiple risk assessments such as, for example, access complexity of a patch, authentication of a patch, confidentiality impact of a patch, availability of a patch, etc. In certain embodiments, the risk classification component 108 can determine a risk assessment for a group of infrastructure elements associated with a computer system environment. A group of infrastructure elements can be defined as a unit that shares risk impact. For example, a vulnerable server may impact one or more computers in a corresponding subnet and/or one or more computers that run in a corresponding application.

In an embodiment, the risk classification data 118 generated by the risk classification component 108 can include a criticality level for the computer system environment. For instance, a criticality level can be defined by one or more factors and/or criteria such as, but not limited to, a potential security measure of a computer system environment associated with the first patch profile 114 and the second patch profile 116, a failure rate of a computer system environment associated with the first patch profile 114 and the second patch profile 116, a total cost of ownership of a computer system environment associated with the first patch profile 114 and the second patch profile 116, overall operations of a computer system environment associated with the first patch profile 114 and the second patch profile 116, system downtime of a computer system environment associated with the first patch profile 114 and the second patch profile 116, behavior of a computer system environment associated with the first patch profile 114 and the second patch profile 116, and/or another factor for a computer system environment associated with the first patch profile 114 and the second patch profile 116. A criticality level can also be a risk weight for a computer system environment associated with the first patch profile 114 and the second patch profile 116.

In an aspect, the risk classification data 118 generated by the risk classification component 108 can include a particular criticality level based on information provided by the vertical stack component 104 and the horizontal stack component 106. For example, the risk classification data 118 can include a level 1 criticality level that indicates tolerability of certain system functions of a computer system environment that satisfy a defined criterion such as, for example, system functions associated with test and development servers. Additionally or alternatively, the level 1 criticality level can indicate one or more tools of a computer system environment that do not impact other systems such as, for example, test and development servers. In another example, the risk classification data 118 can include a level 2 criticality level that indicates servers of a computer system environment with role of consumptions associated with a loosely designed internet technology infrastructure not contributing to system failure of a computer system environment such as, for example, monitoring systems. In yet another example, the risk classification data 118 can include a level 3 criticality level that indicates heightened criticality such as heavy reliance on internet technology, multiple servers, email and/or other integrated systems where scheduled downtime for a computer system environment is recommended such as, for example, horizontally scalable applications. In yet another example, the risk classification data 118 can include a level 4 criticality level that indicates a single point of failure of a computer system environment which has multiple incoming connections such as, for example, frontend server, a database, etc. In yet another example, the risk classification data 118 can include a level 5 criticality level that indicates an absolutely critical server that may result in a computer system environment malfunctioning such as, for example, a network switch, a domain name system server, a lightweight directory access protocol server, etc.

In certain embodiments, the risk classification component 108 can facilitate display of the risk classification data 118. For instance, the risk classification component 108 can render the risk classification data 118 on a display device. The display device can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In an aspect, the risk classification component 108 can generate a user interface to display at least a portion of the risk classification data 118 in a human interpretable format. In certain embodiments, the risk classification component 108 can apply the risk classification data 118 to a computer system environment associated with the first patch profile 114 and/or the second patch profile 116.

It is to be appreciated that the patch management component 102 (e.g., the vertical stack component 104, the horizontal stack component 106 and/or the risk classification component 108) performs a patch management process associated with patch profiles (e.g., the first patch profile 114 and the second patch profile 116) that cannot be performed by a human (e.g., is greater than the capability of a single human mind). For example, an amount data processed, a speed of processing of data and/or data types processed by the patch management component 102 (e.g., the vertical stack component 104, the horizontal stack component 106 and/or the risk classification component 108) over a certain period of time can be greater, faster and different than an amount, speed and data type that can be processed by a single human mind over the same period of time. The patch management component 102 (e.g., the vertical stack component 104, the horizontal stack component 106 and/or the risk classification component 108) can also be fully operational towards performing one or more other functions (e.g., fully powered on, fully executed, etc.) while also performing the above-referenced patch management process. Moreover, the risk classification data 118 generated by the patch management component 102 (e.g., the vertical stack component 104, the horizontal stack component 106 and/or the risk classification component 108) can include information that is impossible to obtain manually by a user. For example, an amount of information included in the risk classification data 118 and/or a variety of information included in the risk classification data 118 can be more complex than information obtained manually by a user.

Figure 2:
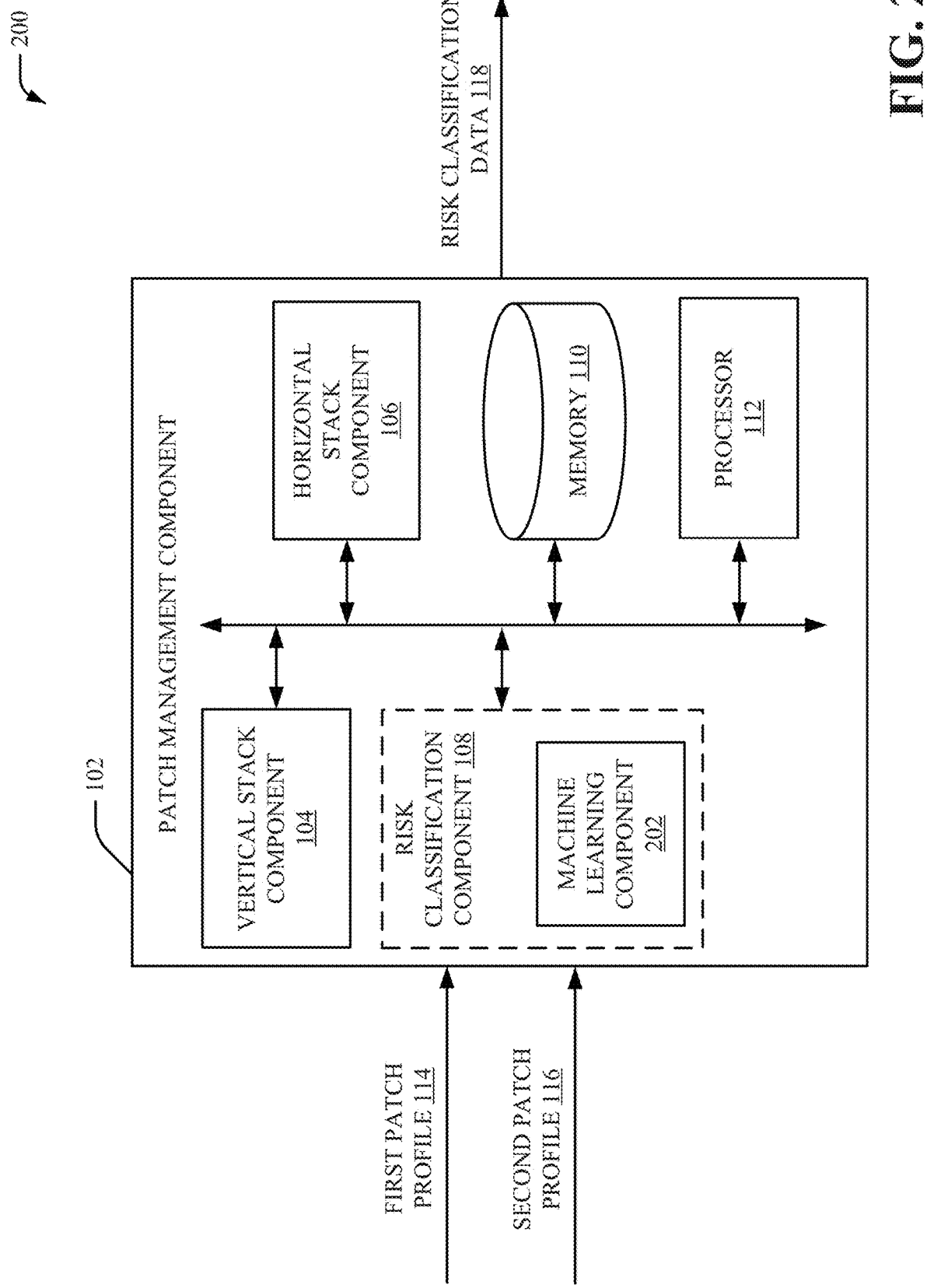
FIG. 2 illustrates a block diagram of another example, non-limiting system that includes a patch management component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the patch management component 102. The patch management component 102 can include the vertical stack component 104, the horizontal stack component 106, and the risk classification component 108. As shown in FIG. 2, the risk classification component 108 can include a machine learning component 202.

The machine learning component 202 can employ principles of artificial intelligence to facilitate generation of the risk classification data and seeks repetitive patterns over time 118. The machine learning component 202 can perform learning with respect to the first patch profile 114 and/or the second patch profile 116 explicitly or implicitly. In an aspect, the machine learning component 202 can generate the risk classification data 118 based on classifications, correlations, inferences and/or expressions associated with principles of artificial intelligence. For instance, the machine learning component 202 can employ an automatic classification system and/or an automatic classification process to generate the risk classification data 118. In one example, the machine learning component 202 can employ a probabilistic and/or statistical-based analysis (e.g., factoring into the analysis utilities and costs) to learn and/or generate inferences with respect to the first patch profile 114 and/or the second patch profile 116. In an aspect, the machine learning component 202 can include an inference component (not shown) that can further enhance automated aspects of the machine learning component 202 utilizing in part inference based schemes to facilitate generation of the risk classification data 118. The machine learning component 202 can employ any suitable machine-learning based techniques, statistical-based techniques and/or probabilistic-based techniques. For example, the machine learning component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 202 can perform a set of machine learning computations associated with generation of the risk classification data 118. For example, the machine learning component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to generate the risk classification data 118.

Figure 3:
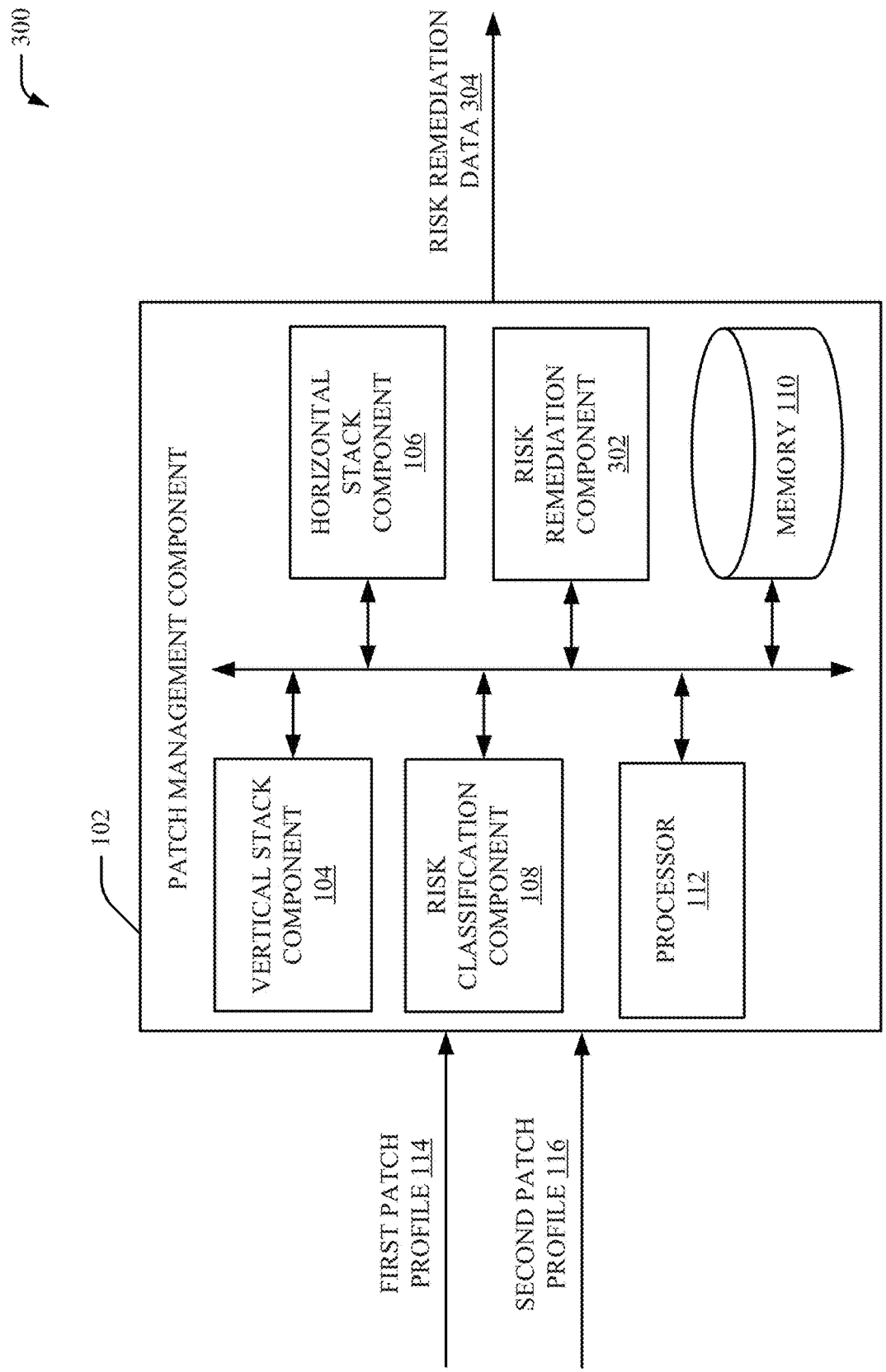
FIG. 3 illustrates a block diagram of yet another example, non-limiting system that includes a patch management component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the patch management component 102. The patch management component 102 can include the vertical stack component 104, the horizontal stack component 106, the risk classification component 108 and a risk remediation component 302. In certain embodiments, the risk classification component 108 can include the machine learning component 202.

In an aspect, the risk remediation component 302 can generate risk remediation data 304. The risk remediation data 304 can include an execution plan to alter one or more portions of the computer system environment. For example, the risk remediation component 302 can determine an execution plan to alter one or more portions of the computer system environment based on the risk classification data 118. The one or more portions of the computer system environment can include one or more portions of the software system of the computer system environment and/or one or more portions of the hardware system of the computer system environment. In an embodiment, the risk remediation component 302 can determine a patch to apply to the computer system environment based on the risk classification the risk classification data 118. The risk remediation data 304 can additionally or alternatively include the patch to apply to the computer system environment. The patch can include a process to repair the one or more portions of the computer system environment. The patch can be, for example, a software patch that includes a set of processing threads to alter the one or more portions of the computer system environment based on the risk classification data 118. In yet another embodiment, the risk remediation component 302 can apply the execution plan to alter the one or more portions of the computer system environment in response to a determination that user input data (e.g., user input data associated with a display device in communication with the patch management component 102) satisfies a defined criterion. The display device can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In certain embodiments, patch management component 102 (e.g., the risk remediation component 302) can be in communication with the computing device via a network (e.g., a network device) such as, but not limited to, a local area networks (LAN), a wide area network (WAN) such as the Internet, and/or a network that provides interconnections for devices associated with a workspace environment. In certain embodiments, the risk remediation component 302 can facilitate display of the risk remediation data 304. For instance, the risk remediation component 302 can render the risk remediation data 304 on the display device. In certain embodiments, the risk remediation component 302 can apply the risk remediation data 304 to a computer system environment associated with the first patch profile 114 and/or the second patch profile 116.

Figure 4:
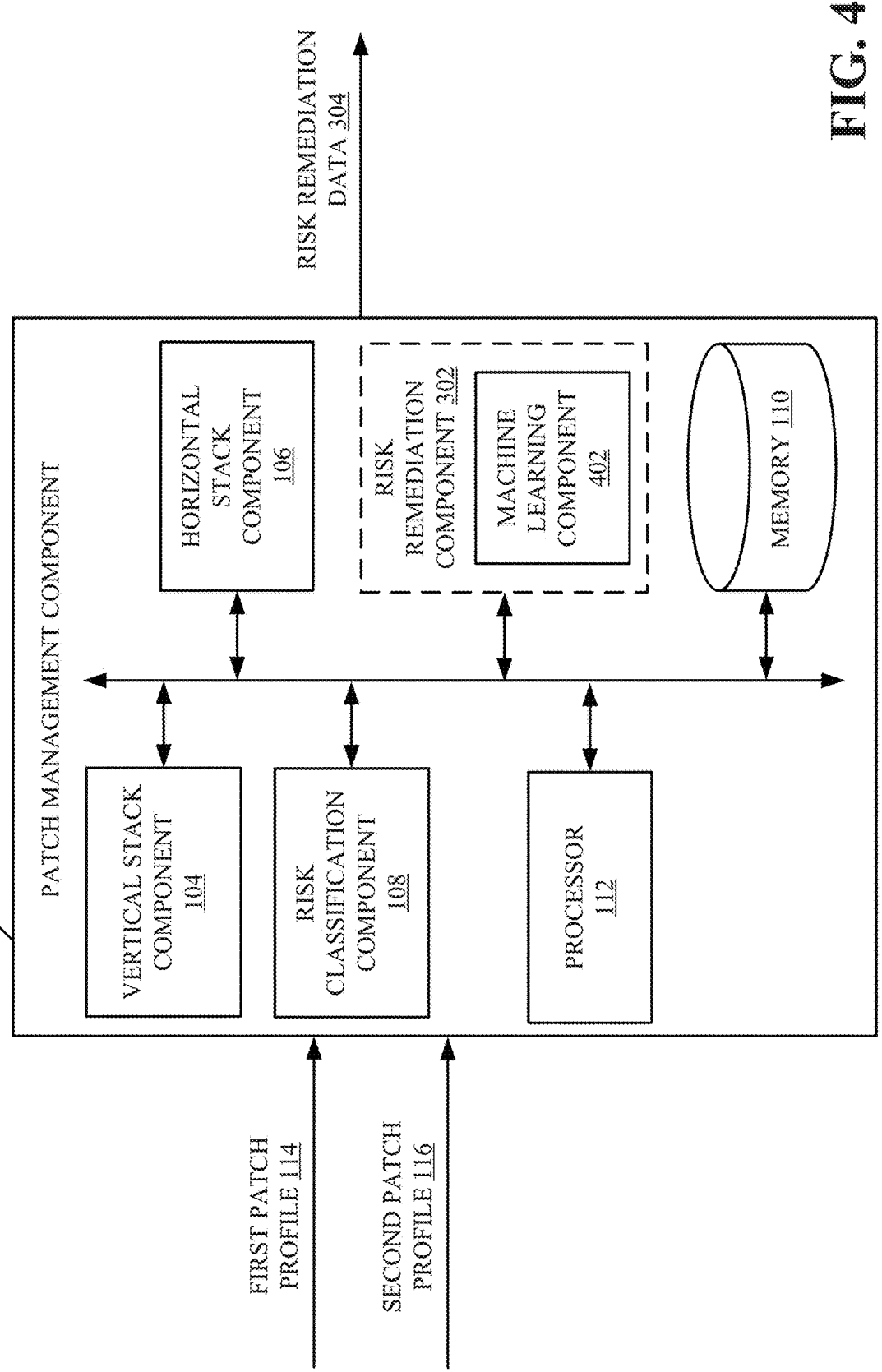
FIG. 4 illustrates a block diagram of yet another example, non-limiting system that includes a patch management component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the patch management component 102. The patch management component 102 can include the vertical stack component 104, the horizontal stack component 106, the risk classification component 108 and the risk remediation component 302. In certain embodiments, the risk classification component 108 can include the machine learning component 202. As shown in FIG. 4, the risk remediation component 302 can include a machine learning component 402.

The machine learning component 402 can employ principles of artificial intelligence to facilitate generation of the risk remediation data 304. The machine learning component 402 can perform learning with respect to the first patch profile 114 and/or the second patch profile 116 explicitly or implicitly. In an aspect, the machine learning component 402 can generate the risk remediation data 304 based on classifications, correlations, inferences and/or expressions associated with principles of artificial intelligence. For instance, the machine learning component 402 can employ an automatic classification system and/or an automatic classification process to generate the risk remediation data 304. In one example, the machine learning component 402 can employ a probabilistic and/or statistical-based analysis (e.g., factoring into the analysis utilities and costs) to learn and/or generate inferences with respect to the first patch profile 114 and/or the second patch profile 116. In an aspect, the machine learning component 402 can include an inference component (not shown) that can further enhance automated aspects of the machine learning component 402 utilizing in part inference based schemes to facilitate generation of the risk remediation data 304. The machine learning component 402 can employ any suitable machine-learning based techniques, statistical-based techniques and/or probabilistic-based techniques. For example, the machine learning component 402 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 402 can perform a set of machine learning computations associated with generation of the risk remediation data 304. For example, the machine learning component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to generate the risk remediation data 304.

Figure 5:
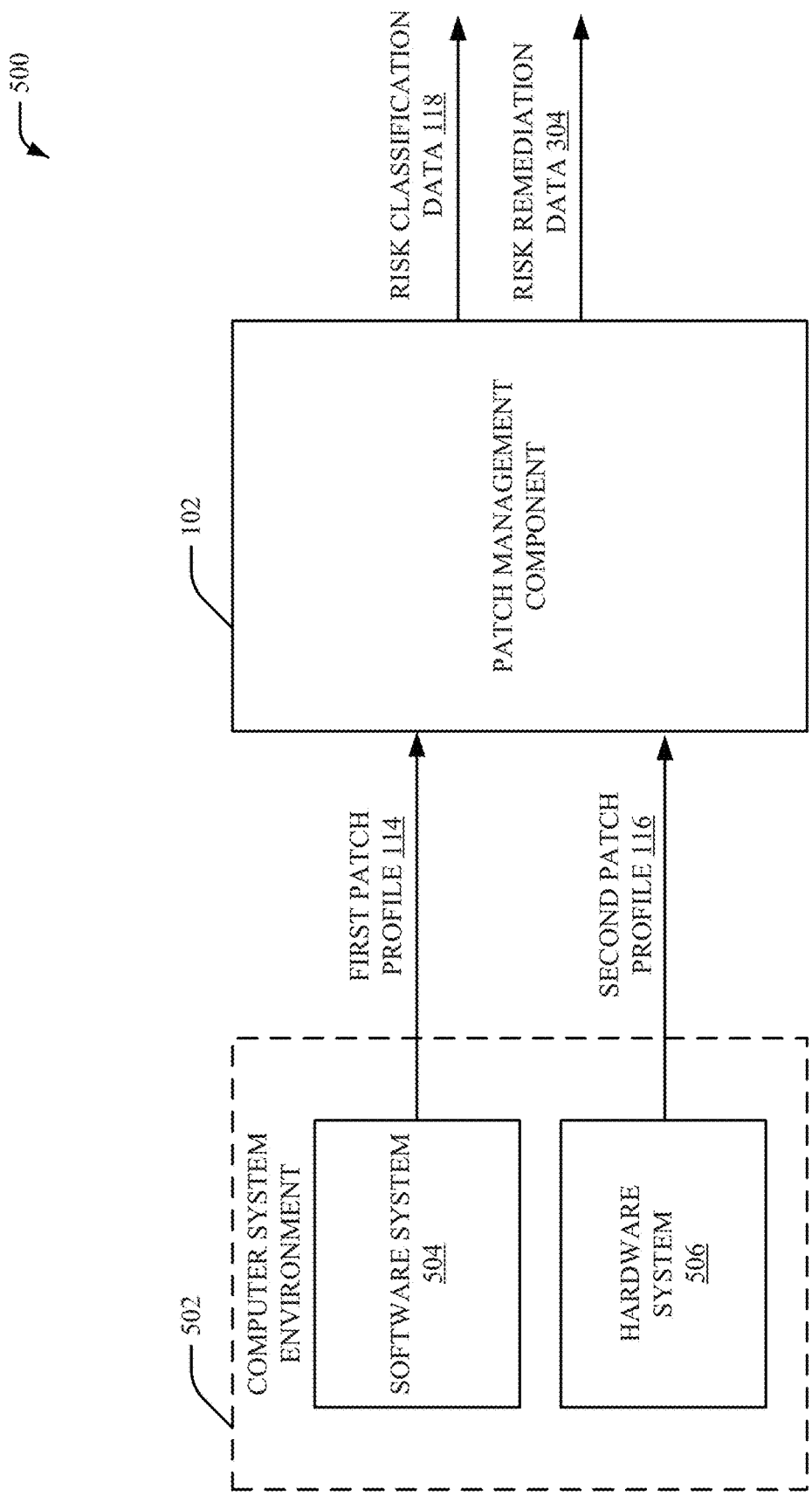
FIG. 5 illustrates a block diagram of an example, non-limiting system to facilitate group patching recommendation and/or remediation with risk assessment in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a computer system environment 502 and the patch management component 102. The computer system environment 502 can be a computer system that includes a software system 504 and a hardware system 506. The software system 504 can include one or more software components of the computer system environment 502. For example, the software system 504 can include an operating system for the computer system environment 502, one or more non-volatile memory resources (e.g., one or more libraries) for the computer system environment 502, one or more applications for the computer system environment 502 that performs one or more tasks, one or more platforms for the computer system environment 502 that hosts one or more applications, and/or another type of software component. The hardware system 506 can include one or more hardware components of the computer system environment 502. For example, the hardware system 506 can include one or more servers, one or more processors (e.g., one or more computing workload devices), one or more network nodes, a group of servers, and/or another hardware component. In an aspect, the first patch profile 114 can include information associated with the software system 504. For example, the first patch profile 114 can include information associated with an operating system for the computer system environment 502, one or more non-volatile memory resources (e.g., one or more libraries) for the computer system environment 502, one or more applications for the computer system environment 502 that performs one or more tasks, one or more platforms for the computer system environment 502 that hosts one or more applications, and/or another type of software component. Furthermore, the second patch profile 116 can include information associated with the hardware system 506. For example, the second patch profile 116 can include information associated with one or more servers, one or more processors (e.g., one or more computing workload devices), one or more network nodes, a group of servers, a type of server, and/or another hardware component. The patch management component 102 can employ the first patch profile 114 associated with the software system 504 and the second patch profile 116 associated with the hardware system 506 to generate the risk classification data 118.

In an embodiment, the risk remediation data 304 generated by the patch management component 102 can provide recommended vulnerability risk remediation plans based on a vulnerability risk assessment included in the risk classification data 118. The patch management component 102 can also identify missing patches based on the first patch profile 114. For example, the patch management component 102 can also identify missing patches based on information associated with a computer operating system of the computer system environment 502, platforms of the computer system environment 502, workloads of the computer system environment 502, applications of the computer system environment 502, etc. The patch management component 102 can also assess risk measures based on different characteristics of the computer system environment 502. For example, the patch management component 102 can also assess risk measures based on characteristics of the software system 504 and/or the hardware system 506. In one example, the patch management component 102 can also assess risk measures based on operating system characteristics, platform characteristics, workload characteristics, application characteristics, missing patch characteristics (vendor ratings, scoring, etc.). Additionally or alternatively, the patch management component 102 can also assess risk measures based on user defined attributes for the computer system environment 502. For example, the patch management component 102 can also assess risk measures based on user defined attributes for the software system 504 and/or the hardware system 506. Additionally or alternatively, the patch management component 102 can assess risk at various groups such as, for example, server groups, server types, etc. In an aspect, the risk remediation data 304 can include recommended vulnerability remediation plans to achieve target risk measures associated with the risk classification data 118.

In another embodiment, the patch management component 102 can be an engine that assesses a risk level for the computer system environment. The patch management component 102 can also recommend risk remediation execution plans to move from a current risk level to target risk level to lower vulnerability risk of the computer system environment 502. In certain embodiments, the patch management component 102 can operate as part of a hybrid cloud management system that employs continuous security patching to meet a target risk level. Additionally or alternatively, the patch management component 102 can also be employed as a proactive risk protection system and/or a security analysis system. In certain embodiments, the patch management component 102 can employ learning to capture repeatable patterns associated with the computer system environment 502. For example, the patch management component 102 can employ learning to capture repeatable patterns associated with computers, patches, and/or patch execution features of the computer system environment 502. The learning performed by the patch management component 102 can employ history data to identify similar patterns in the computer system environment 502, perform software updates for the computer system environment 502, apply patches to the computer system environment 502, cure software bugs in the computer system environment 502, etc. As such, a vulnerabilities status of the computer system environment 502 can be continuously monitored with risk measures. Furthermore, a set of actions for the computer system environment 502 can be recommended and/or executed to reduce the vulnerability exposures of the computer system environment 502. Malicious viruses and/or attacks associated with the computer system environment 502 can also be reduced by employing the patch management component 102. Performance of the computer system environment 502 can also be improved by employing the patch management component 102.

Figure 6:
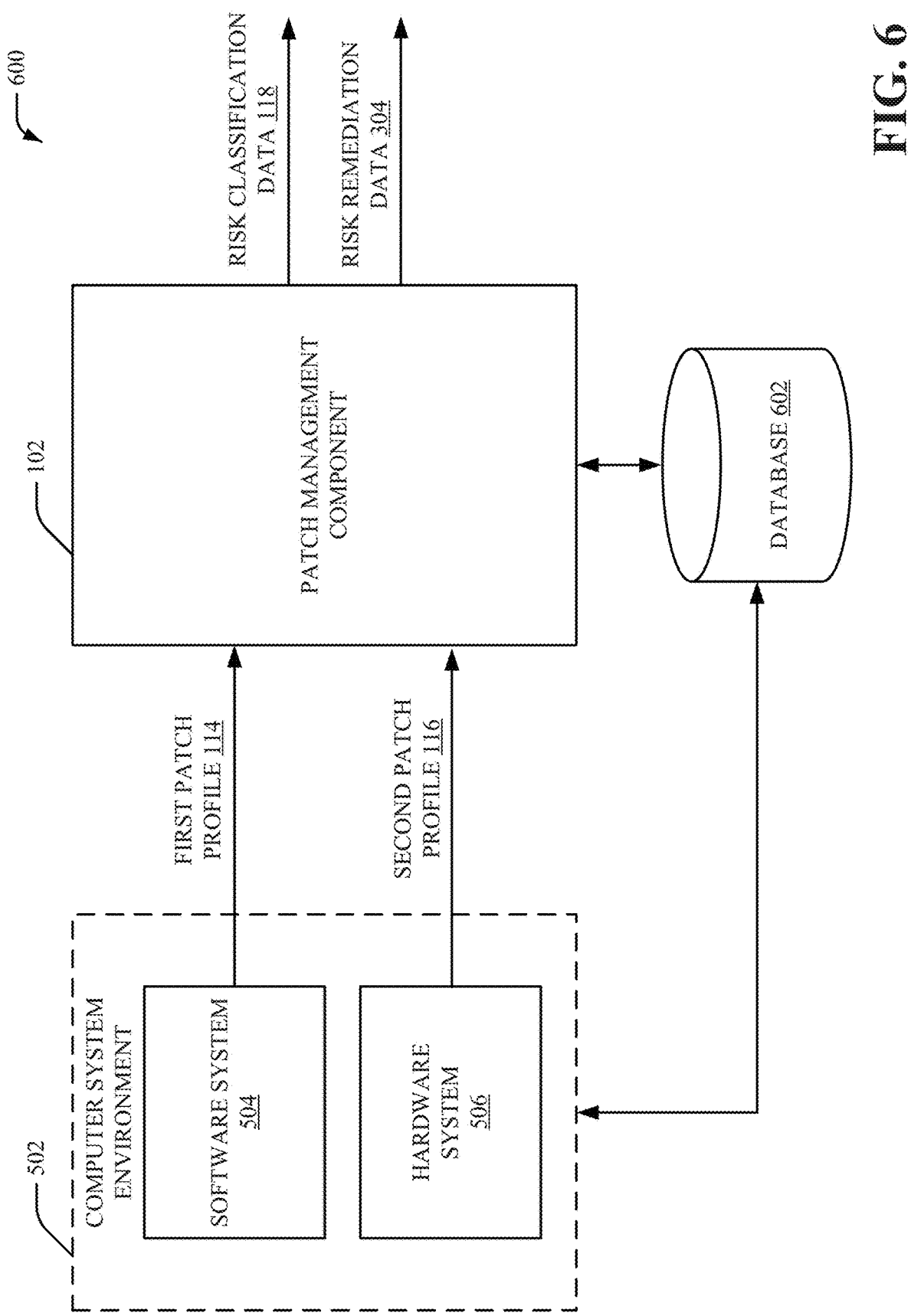
FIG. 6 illustrates a block diagram of another example, non-limiting system to facilitate group patching recommendation and/or remediation with risk assessment in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes the computer system environment 502, the patch management component 102 and a database 602. The computer system environment 502 can be a computer system that includes a software system 504 and a hardware system 506.

The database 602 can be, for example, a patch database. For example, the database 602 can store a set of patches. In certain embodiments, the first patch profile 114 and/or the second patch profile 116 can be stored in the database 602. In an embodiment, the patch management component 102 can be a cognitive system that generates a risk assessment for the computer system environment 502 based on one or more patches stored in the database 602 and/or a set of defined policies. The set of defined policies can include, for example, a defined risk threshold for the computer system environment 502. The risk assessment generated by the patch management component 102 can be based on server criticality and a patch risk. In a non-limiting example where the defined risk threshold is equal to 0.7 and a determined risk for the computer system environment 502 is greater than 0.7, the patch management component 102 can determine a set of patches to reduce the determined risk below 0.7 and/or can apply the set of patches to the computer system environment 502. Furthermore, in response to a determination that the determined risk is equal to or below 0.7 for the computer system environment 502, the patch management component 102 can continue assessing risk for the computer system environment 502.

Figure 7:
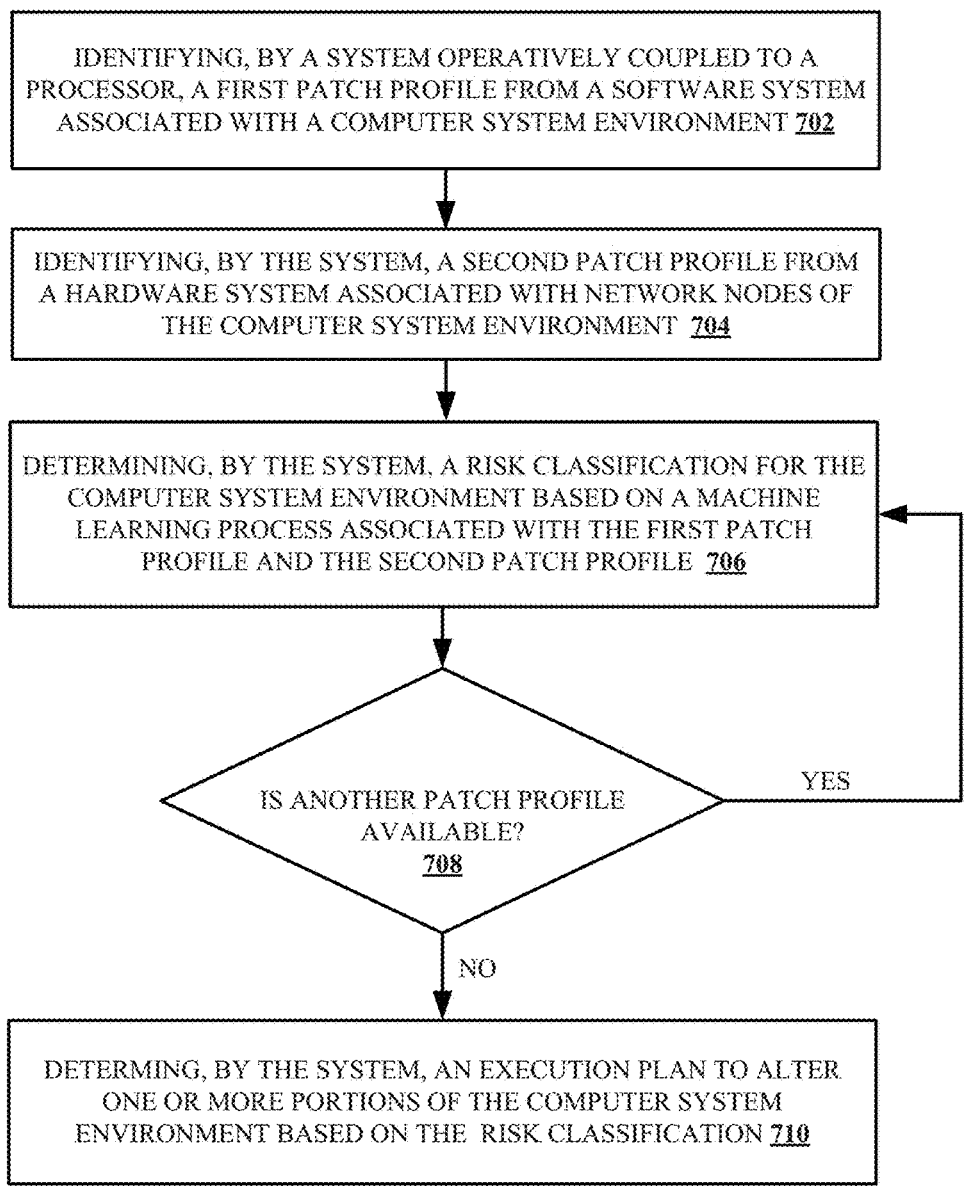
FIG. 7 illustrates a flow diagram of an example, non-limiting computer-implemented method for facilitating group patching recommendation and/or remediation with risk assessment in accordance with one or more embodiments described herein.

FIG. 7 illustrates a flow diagram of an example, non-limiting computer-implemented method 700 that facilitates group patching recommendation and/or remediation with risk assessment in accordance with one or more embodiments described herein. At 702, a first patch profile from a software system associated with a computer system environment is identified by a system operatively coupled to a processor (e.g., by vertical stack component 104). The first patch profile can be, for example, a patch profile for an operating system for the computer system environment, one or more non-volatile memory resources (e.g., one or more libraries) for the computer system environment, one or more applications for the computer system that performs one or more tasks, one or more platforms for the computer system environment that hosts one or more applications, etc.

At 704, a second patch profile from a hardware system associated with network nodes of the computer system environment is identified by the system (e.g., by horizontal stack component 106). The second patch profile can be, for example, a patch profile for a server, a processor (e.g., a computing workload device), a group of servers, a type of server, etc.

At 706, a risk classification for the computer system environment determining, by the system (e.g., by risk classification component 108), based on a machine learning process associated with the first patch profile and the second patch profile. The risk classification can be a risk measure and/or a classification profile for the computer system environment. In one example, the risk classification can include a criticality level for the computer system environment. For instance, a criticality level can be defined by one or more factors and/or criteria such as, but not limited to, a potential security measure of the computer system environment a potential failure rate of the computer system environment, a total cost of ownership of the computer system environment, cost and/or risk of performing operations within the computer system environment, system downtime impact of the computer system environment, behavior of the computer system environment, and/or another vulnerability factor of the computer system environment.

At 708, it is determined whether another patch profile is available. If yes, the method 700 returns to 706 to determine another risk classification using the other patch profile (e.g., a third patch profile, etc.). If no, the method 700 proceeds to 710

At 710, an execution plan to alter one or more portions of the computer system environment is determined, by the system (e.g., by risk remediation component 302), based on the risk classification. In one example, the execution plan can include a patch to apply to the computer system environment based on the risk classification. In another example, the execution plan can alter the one or more portions of the computer system environment in response to a determination that user input data associated with a computing device in communication with the system satisfies a defined criterion.

In certain embodiments, the method 700 can include computing, by the system, a first risk value for the software system based on the first patch profile, and computing, by the system, a second risk value for the hardware system based on the second patch profile. In an embodiment, the risk classification can be determined by performing the machine learning process to determine the risk classification for the computer system environment based on the first risk value for the software system and the second risk value for the hardware system.

Figure 8:
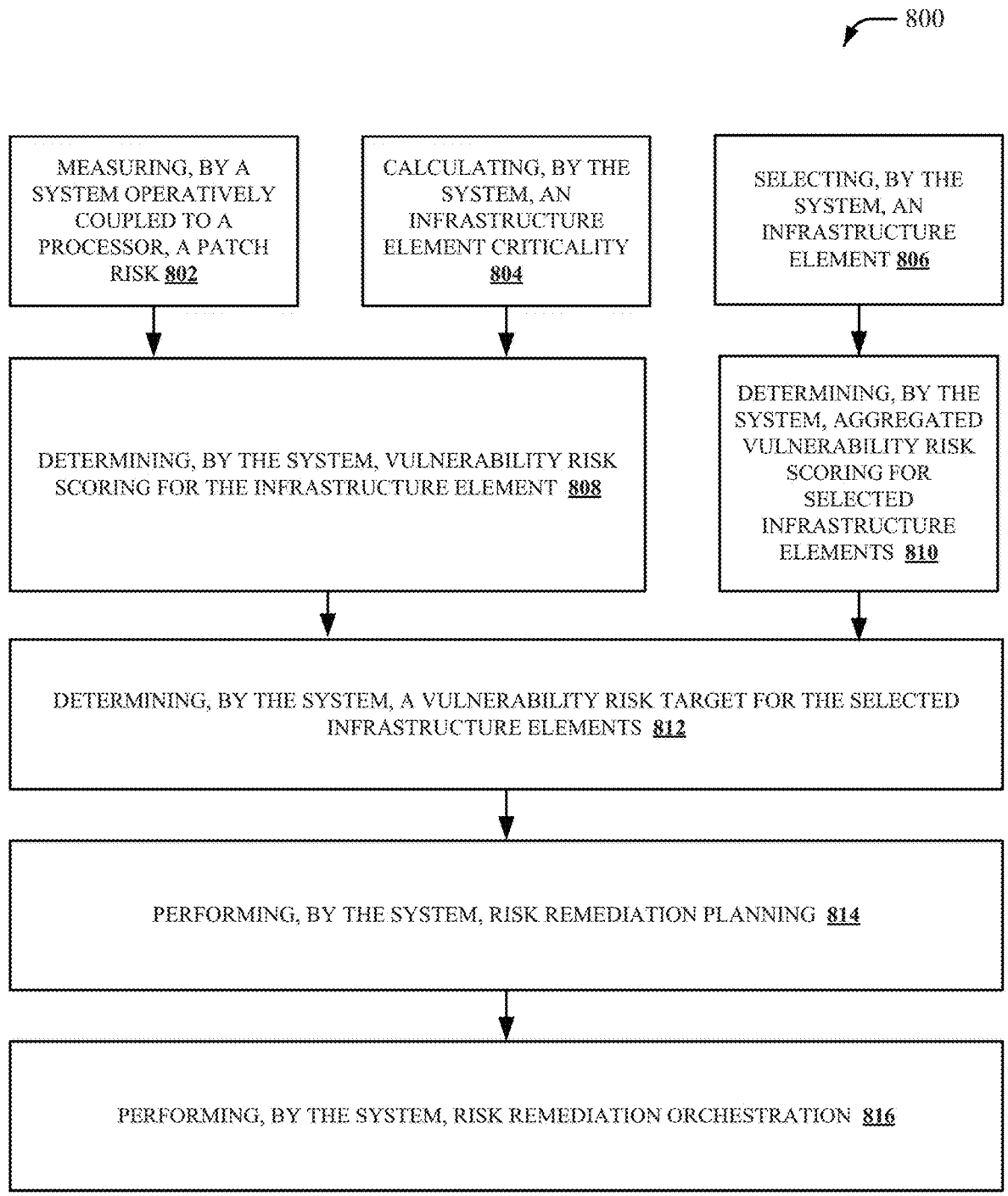
FIG. 8 illustrates a flow diagram of another example, non-limiting computer-implemented method for facilitating group patching recommendation and/or remediation with risk assessment in accordance with one or more embodiments described herein.

FIG. 8 illustrates a flow diagram of an example, non-limiting computer-implemented method 800 that facilitates group patching recommendation and/or remediation with risk assessment in accordance with one or more embodiments described herein. At 802, a patch risk is measured by a system operatively coupled to a processor (e.g., by risk classification component 108). After 802, method 800 proceed to 808. At 804, an infrastructure element criticality is calculated by the system (e.g., by risk classification component 108). After 804, method 800 proceed to 808. At 806, an infrastructure element is selected by the system (e.g., by risk classification component 108). After 806, method 800 proceeds to 810. At 808, vulnerability risk scoring for the infrastructure element is determined by the system (e.g., by risk classification component 108). After 808, method 800 proceed to 812. At 810, aggregated risk scoring for selected infrastructure elements is determined by the system (e.g., by risk classification component 108). After 810, method 800 proceed to 812. At 812, a vulnerability risk target for the selected infrastructure elements is determined by the system (e.g., by risk classification component 108). At 814, risk remediation planning is performed by the system (e.g., by risk remediation component 302). At 816, risk remediation orchestration is performed by the system (e.g., by risk remediation component 302).

Figure 9:
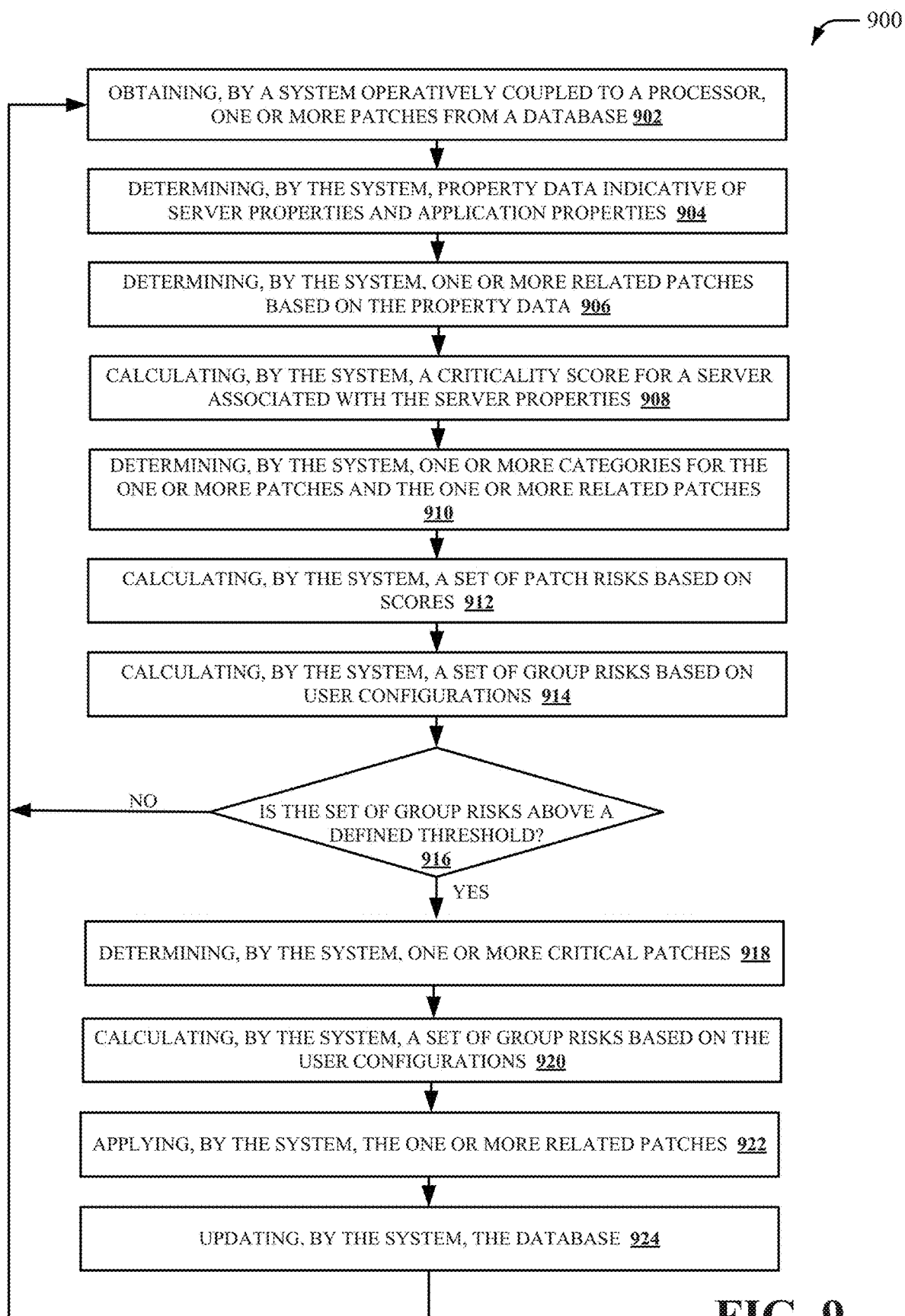
FIG. 9 illustrates a flow diagram of yet another example, non-limiting computer-implemented method for facilitating group patching recommendation and/or remediation with risk assessment in accordance with one or more embodiments described herein.

FIG. 9 illustrates a flow diagram of an example, non-limiting computer-implemented method 900 that facilitates group patching recommendation and/or remediation with risk assessment in accordance with one or more embodiments described herein. At 902, one or more patches from a database are obtained by a system operatively coupled to a processor (e.g., by patch management component 102). At 904, property data indicative of server properties and application properties is determined by the system (e.g., by patch management component 102). At 906, one or more related patches are determined by the system (e.g., by patch management component 102) based on the property data. At 908, a criticality score for a server associated with the server properties is calculated by the system (e.g., by patch management component 102). At 910, one or more categories of the one or more patches and the one or more related patches is determined by the system (e.g., by patch management component 102). At 912, a set of patch risks is calculated, by the system (e.g., by patch management component 102), based on the scores. At 914, a set of group risks is calculated, by the system (e.g., by patch management component 102), based on user configurations. At 916, it is determined whether the set of group risks is above a defined threshold. If no, method 900 returns to 902. If yes, method 900 proceeds to 918. At 918, one or more critical patches are determined by the system (e.g., by patch management component 102). At 920, a set of group risks is determined, by the system (e.g., by patch management component 102), based on the user configurations. At 922, the one or more related patches is applied by the system (e.g., by patch management component 102). At 924, the database is updated by the system (e.g., by patch management component 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least determining a risk classification and/or determining an execution plan are established from a combination of electrical and mechanical components and circuitry, a human is unable to replicate or perform processing performed by the patch management component 102 (e.g., vertical stack component 104, the horizontal stack component 106, the risk classification component 108, the machine learning component 202, the risk remediation component 302, and/or the machine learning component 402) disclosed herein. For example, a human is unable to communicate patch profiles, analyze patch profiles, perform a machine learning process associated with patch profiles.

Figure 10:
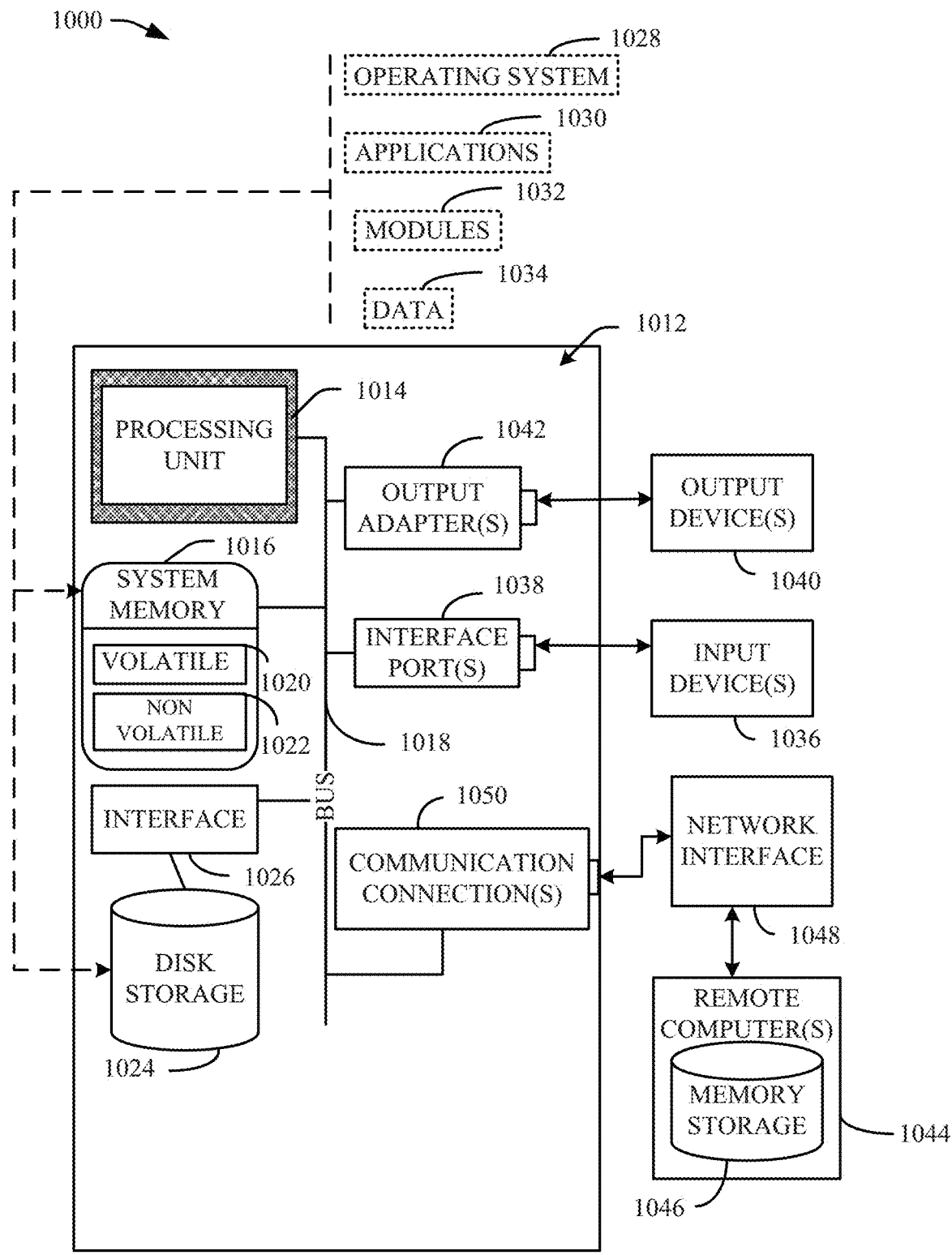
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
a vertical stack component that identifies a first patch profile from software systems associated with a computer system environment comprising a plurality of devices;
a horizontal stack component that identifies a second patch profile from hardware systems associated with network nodes of the computer system environment;
a risk classification component that:
determines at least one patch to be applied to the computer system environment based on the first patch profile and the second patch profile,
performs a machine learning process to determine risk classification data for the computer system environment based on the first patch profile, the second patch profile, and at least one patch risk for the at least one patch to be applied to the computer system environment, wherein the risk classification data comprises a criticality level of the computer system environment and the at least one patch risk for at least one patch to be applied to the computer system environment, wherein the criticality level of the computer system environment is based on a failure rate of the computer system environment based on the first patch profile and the second patch profile, and an impact of a failure of the computer system environment; and
a risk remediation component that applies an execution plan specifying one or more patches of the at least one patch to implement to alter the one or more portions of the computer system environment based on the-risk classification data in response to a determination that user input data associated with a computing device in communication with the system satisfies a defined criterion.

2. The system of claim 1, wherein the vertical stack component computes a first risk value for the software system based on the first patch profile, and wherein the horizontal stack component computes a second risk value for the hardware system based on the second patch profile.

3. The system of claim 2, wherein the risk classification component performs the machine learning process to determine the risk classification data for the computer system environment based on the first risk value for the software system and the second risk value for the hardware system.

4. The system of claim 1, wherein the vertical stack component computes a first classification profile for the software system based on the first patch profile, and wherein the horizontal stack component computes a second classification profile for the hardware system based on the second patch profile.

5. The system of claim 4, wherein the risk classification component performs the machine learning process to determine the risk classification data for the computer system environment based on the first classification profile for the software system and the second classification profile for the hardware system.

6. The system of claim 1, wherein the risk classification component learns one or more patterns associated with the computer system environment to determine the risk classification data for the computer system environment.

7. The system of claim 1, wherein the risk remediation component that generates the execution plan to alter the one or more portions of the computer system environment based on the risk classification data.

8. The system of claim 7, wherein the risk remediation component determines the one or more patches of the at least one patch to apply to the computer system environment based on the risk classification data.

9. The system of claim 7, wherein the risk remediation component generates the execution plan to move a current risk level in the risk classification data to a target risk level.

10. The system of claim 1, wherein the risk classification data improves performance of the computer system environment.

11. A computer-implemented method, comprising:
identifying, by a system operatively coupled to a processor, a first patch profile from software systems associated with a computer system environment comprising a plurality of network nodes;
identifying, by the system, a second patch profile from hardware systems associated with the plurality of network nodes of the computer system environment;
determining, by the system, at least one patch to be applied to the computer system environment based on the first patch profile and the second patch profile;
determining, by the system, risk classification data for the computer system environment based on a machine learning process associated with the first patch profile the second patch profile, and at least one patch risk for the at least one patch to be applied to the computer system environment, wherein the risk classification data comprises a criticality level of the computer system environment and the at least one patch risk for at least one patch to be applied to the computer system environment, wherein the criticality level of the computer system environment is based on a failure rate of the computer system environment based on the first patch profile and the second patch profile, and an impact of a failure of the computer system environment; and
applying, by the system, an execution plan specifying one or more patches of the at least one patch to implement to alter the one or more portions of the computer system environment based on the-risk classification data in response to a determination that user input data associated with a computing device in communication with the system satisfies a defined criterion.

12. The computer-implemented method of claim 11, wherein the computer-implemented method further comprises:
computing, by the system, a first risk value for the software system based on the first patch profile; and
computing, by the system, a second risk value for the hardware system based on the second patch profile.

13. The computer-implemented method of claim 12, wherein the determining the risk classification data comprises performing the machine learning process to determine the risk classification data for the computer system environment based on the first risk value for the software system and the second risk value for the hardware system.

14. The computer-implemented method of claim 11, wherein the computer-implemented method further comprises:
determining, by the system, a patch of the at least one patch to apply to the computer system environment based on the risk classification data.

15. The computer-implemented method of claim 11, wherein the computer-implemented method further comprises:
generating, by the system, the execution plan to alter the one or more portions of the computer system environment based on the risk classification data.

16. The computer-implemented method of claim 15, wherein the computer-implemented method further comprises:
generating, by the system, the execution plan to move a current risk level in the risk classification data to a target risk level.

17. The computer-implemented method of claim 11, wherein the determining the risk classification data comprises improving performance of the hardware system.

18. A computer program product facilitating patching recommendation and remediation with risk assessment, the computer program product comprising a computer readable storage medium having program instructions embodied therewith, the program instructions executable by a processor to cause the processor to:
identify, by the processor, a first patch profile from software systems associated with a computer system environment comprising a plurality of network nodes;
identify, by the processor, a second patch profile from hardware systems associated with the plurality of network nodes of the computer system environment;
determine, by the system, at least one patch to be applied to the computer system environment based on the first patch profile and the second patch profile;
determine, by the processor, risk classification data for the computer system environment based on a machine learning process associated with the first patch profile the second patch profile, and at least one patch risk for the at least one patch to be applied to the computer system environment, wherein the risk classification data comprises a criticality level of the computer system environment and the at least one patch risk for at least one patch to be applied to the computer system environment, wherein the criticality level of the computer system environment is based on a failure rate of the computer system environment based on the first patch profile and the second patch profile, and an impact of a failure of the computer system environment;
determine, by the processor, an execution plan specifying one or more patches of the at least one patch to implement to alter one or more portions of the computer system environment based on the risk classification data; and
apply, by the processor, the execution plan to alter the one or more portions of the computer system environment in response to a determination that user input data associated with a computing device satisfies a defined criterion.

19. The computer program product of claim 18, wherein the program instructions are further executable by the processor to cause the processor to:
determine, by the processor, the one or more patches of the at least one patch to apply to the computer system environment based on the risk classification data.

20. The computer program product of claim 19, wherein the program instructions are further executable by the processor to cause the processor to:
generate, by the processor, the execution plan to move a current risk level in the risk classification data to a target risk level.

* * * * *